April 17, 1945.     G. DEARSLEY ET AL     2,373,747
FEEDING DEVICE FOR AUTOMATIC MACHINES
Filed May 13, 1941      5 Sheets-Sheet 1
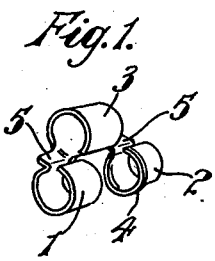
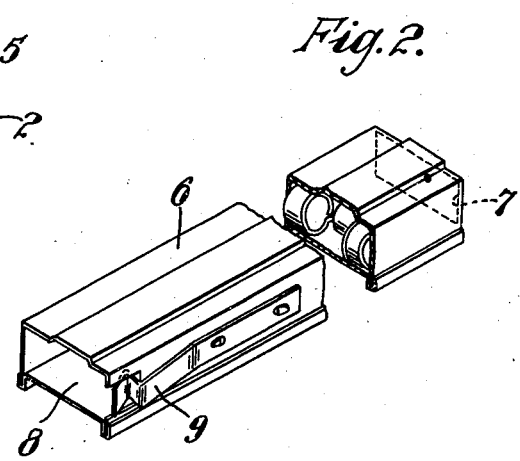
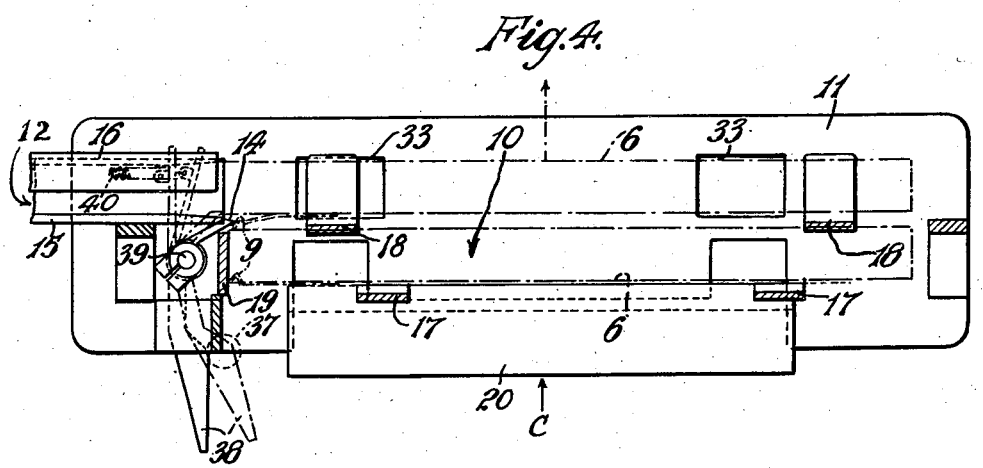

April 17, 1945.  G. DEARSLEY ET AL  2,373,747
FEEDING DEVICE FOR AUTOMATIC MACHINES
Filed May 13, 1941  5 Sheets-Sheet 2
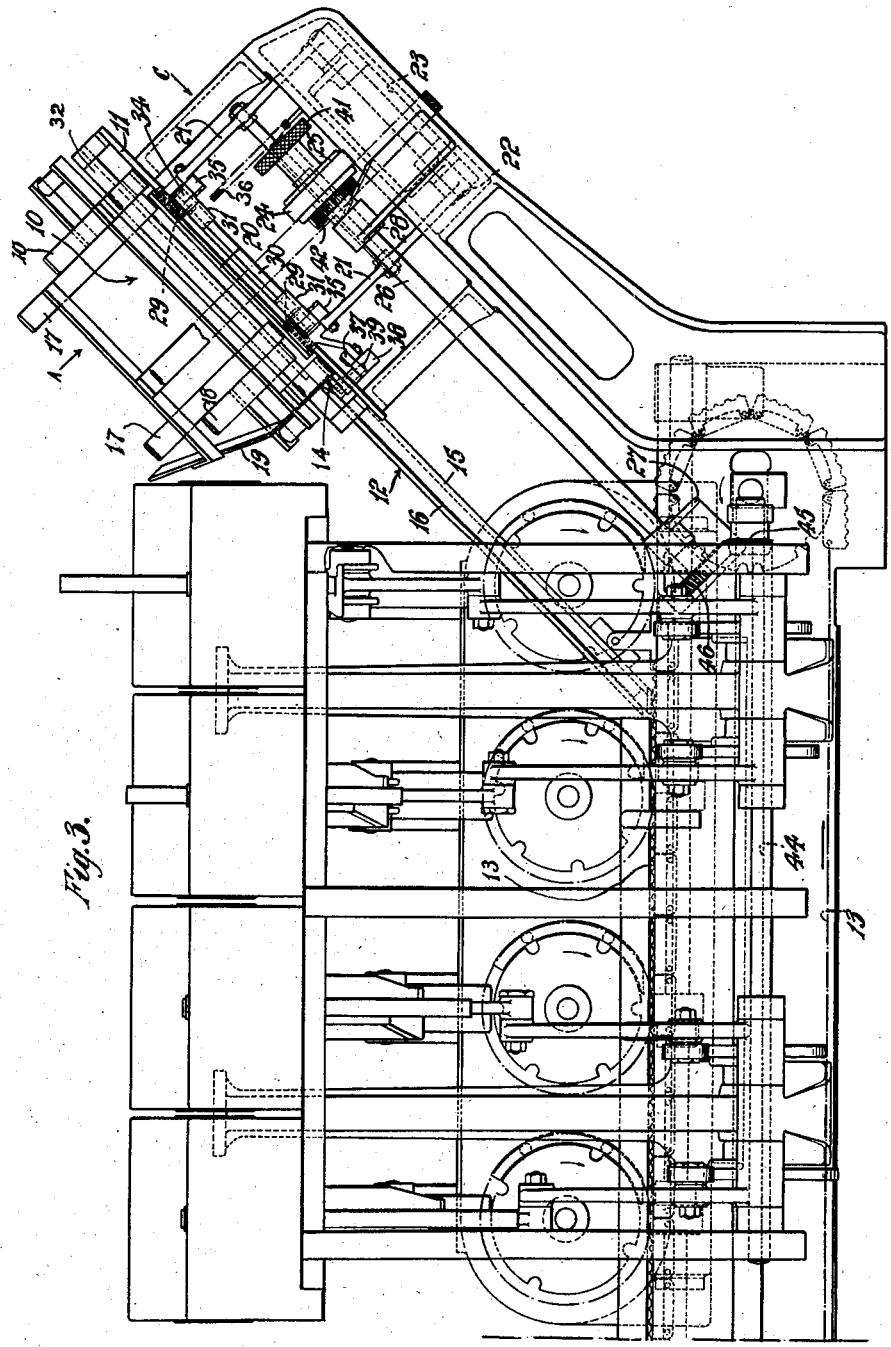

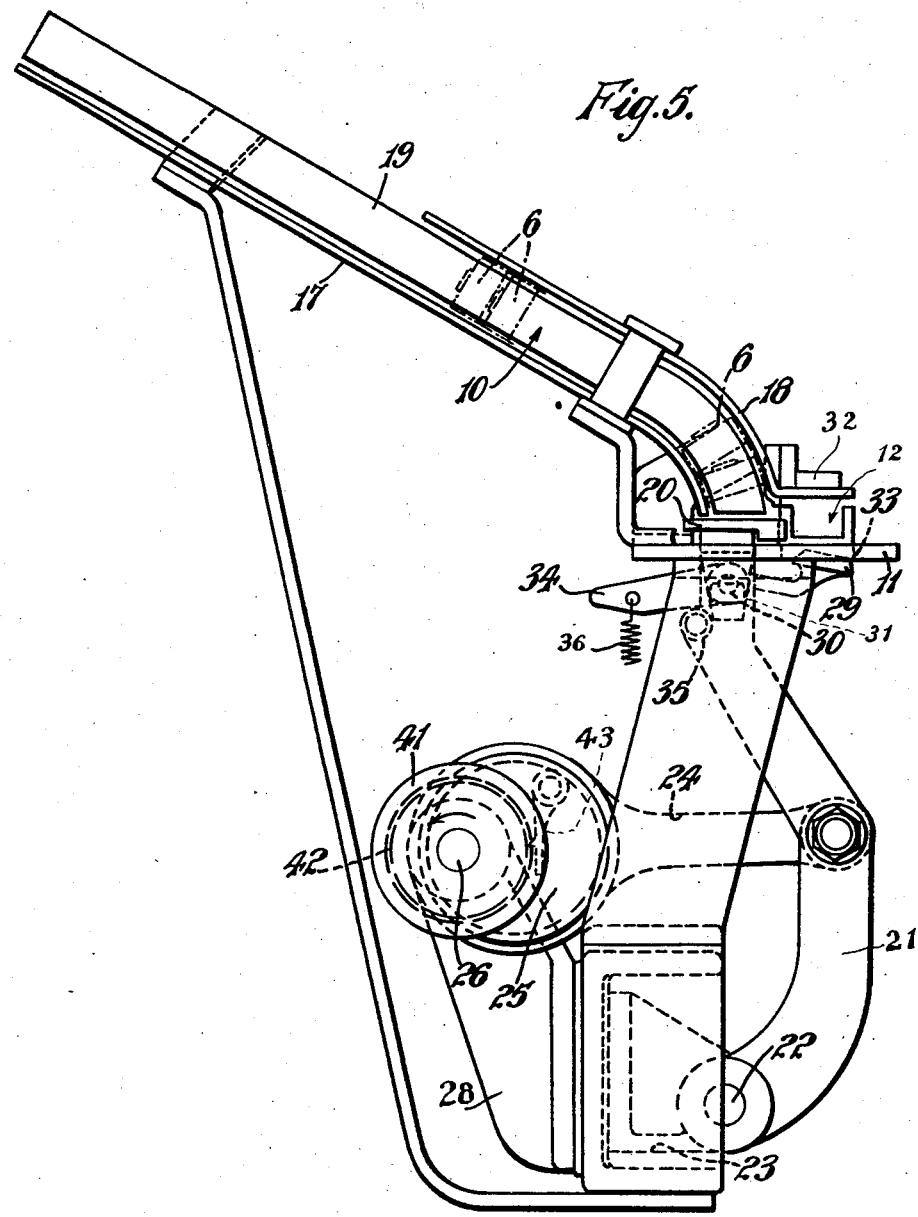

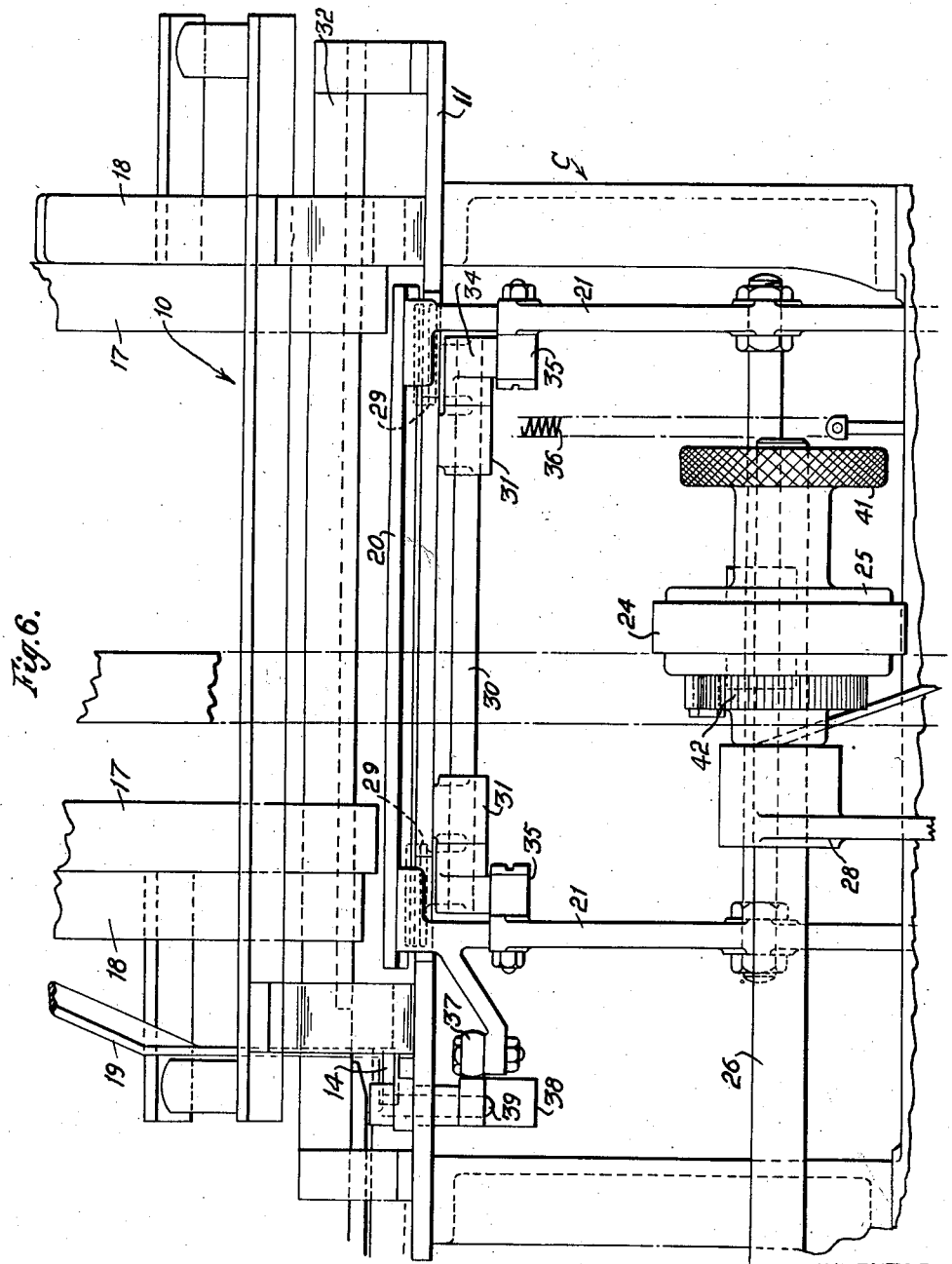

April 17, 1945. G. DEARSLEY ET AL 2,373,747
FEEDING DEVICE FOR AUTOMATIC MACHINES
Filed May 13, 1941 5 Sheets-Sheet 5
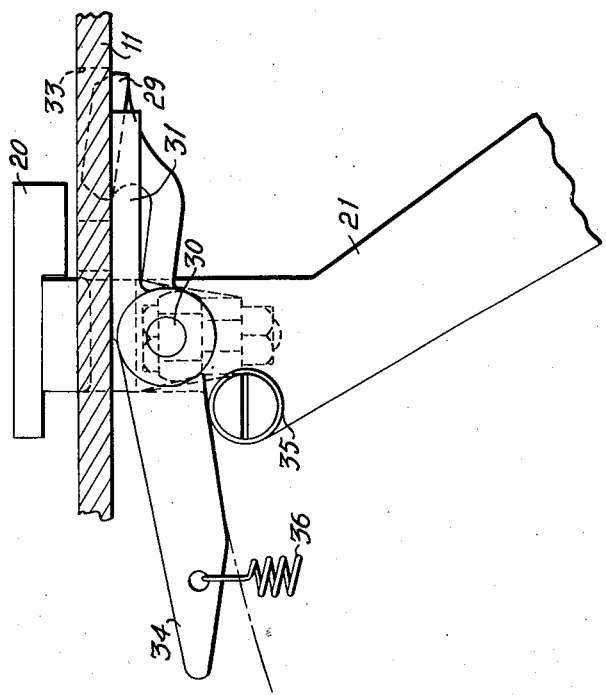
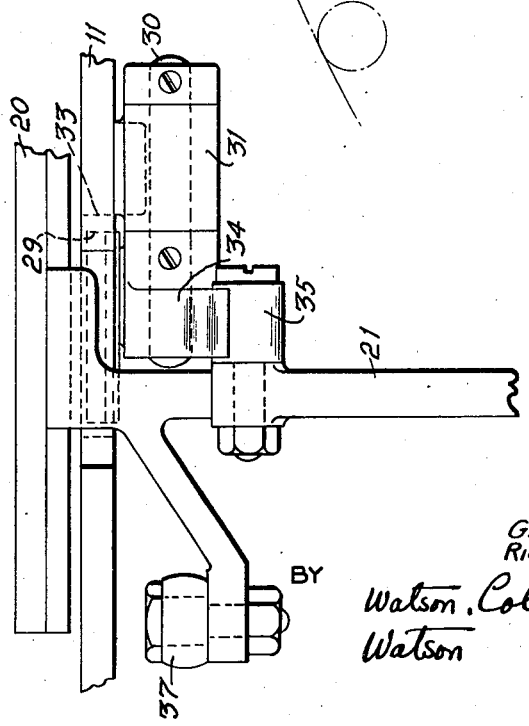
INVENTOR
GEORGE DEARSLEY AND
RICHARD W. HARRIS
BY Watson, Cole, Grindle &
Watson
ATTORNEYS Patented Apr. 17, 1945

2,373,747

UNITED STATES PATENT OFFICE 2,373,747

FEEDING DEVICE FOR AUTOMATIC MACHINES

George Dearsley and Richard William Harris, Deptford, London S.E.8, England, assignors to Molins Machine Company Limited, Deptford, London, England Application May 13, 1941, Serial No. 393,264
In Great Britain May 16, 1940

10 Claims. (Cl. 214—1.1)

This invention relates to feeding devices for automatic machines of the kind wherein articles to be fed to the machines are supplied thereto in chargers from which the articles are ejected or released in order to feed them to the machine.

Apparatus constructed in accordance with the invention may be employed for feeding links for disintegrating cartridge-belts to a machine such as that described in the specification accompanying copending application Serial No. 369,660, filed December 11, 1940. The machine described in the said co-pending application is adapted to assemble links and cartridges to form such belts, but the present invention is applicable to other kinds of machinery and is not limited to use with machine-gun belt assembling machines.

According to the invention there is provided apparatus for feeding chargers to automatic machines, comprising in combination, means for feeding chargers in succession to a discharging position, a support for a charger occupying the discharging position, means to release the contents of a charger while the latter occupies the discharging position and means to remove an empty charger from the discharging position.

Further according to the invention there is provided apparatus for feeding links to a cartridge-belt assembling and charging machine, comprising in combination, an inclined support, means to feed loaded chargers in succession to a discharging position on said support, each charger having an open end and a resilient catch adjacent the open end to retain oriented links within the charger, each charger being fed to the support so that when resting thereon it is inclined lengthwise in a downward direction with its open end in the lower position, means to release the resilient catch to permit the links to slide out of the charger, and means to retain the oriented arrangement of the links during their passage from the charger to the assembling and charging machine.

The chargers to be fed may be superimposed in a magazine and a pusher provided to feed the lowermost charger from the magazine on to said support. A charger being moved from the magazine on to the support may be arranged to move an empty charger from the discharging position. A gripping-device may be provided to retain a charger in position during the discharge of its contents.

Means operable at will may be provided to effect temporary increases in the rate at which chargers are fed to the discharging position to compensate for shortages occurring in the contents of chargers, (e. g., in a case where partly filled chargers are placed in the magazine).

One embodiment of the invention will now be described by way of example with reference to the accompanying drawings in which—

Figure 1 is a perspective view of a link for use in a machine-gun belt of the disintegrating type.

Figure 2 is a perspective view showing the charger containing the links correctly oriented and ready for feeding to a belt assembling machine.

Figure 3 is a front elevation of a part of a machine for assembling and charging a disintegrating belt.

Figure 4 is a plan of part of Figure 3 drawn to an enlarged scale, the view being taken in the direction of the arrow A.

Figure 5 is a view of part of Figure 3 looking in the direction of the arrow C.

Figure 6 is an enlarged view of a portion of the structure shown in Figure 3.

Figure 7 is a fragmentary view, slightly enlarged, of a portion of the structure shown in Figure 6; and Figure 8 is an end elevation of Figure 7.

Referring to Figure 1, the link which is made of spring steel or other suitable material has three curved portions shaped as loops two of which, I and 2, are spaced apart at one end of the link and are arranged as clips to fit tightly on a cartridge while the other curved portion 3 is a loop of a larger diameter than that of the clips I and 2 so as to be a loose fit about a cartridge. The curved portion 3 of one link is arranged to be aligned with the clips I and 2 of a second link and positioned between such clips I and 2. A cartridge is then passed through the aligned curved portions of the links so that the two links are connected together.

The clips I and 2 are slightly different in diameter to suit the shell of the cartridge which is stepped down at the position where the bullet is held. The clip I is the larger of the two and the smaller clip 2 is provided with a curved lip 4 to form a lead for the cartridge case when the cartridges are being assembled with the links.

The curved portion 3 is considerably larger than the others and only loosely embraces a cartridge. When the links and cartridges are assembled, the belt is therefore properly articulated and flexible. The clips I and 2 are joined to the curved portion 3 by shoulders 5.

The links are supplied in chargers 6 shown in Figure 2. These chargers are five sided metal containers having at one end a wall 7 and at the opposite end an open mouth 8. A resilient catch 9 normally retains the links within the charger and all the links point in the direction shown, i. e., with the clips leading. The links are oriented before being placed in a charger and when in the latter they are so arranged that the curved portion of a link is disposed between the spaced clips of an adjacent link.

The chargers 6 are superimposed in a magazine indicated generally by the reference 10, the magazine being mounted on an inclined support 11. The support 11 slopes downwardly at an angle as shown in Figure 3 and its upper surface is parallel with the bottom of a guide-passage indicated generally by the reference 12 which guides the links downwardly on to a conveyor 13 on which the links are assembled with cartridges in the manner described in the specification accompanying co-pending application Serial No. 369,660. Devices which will be described below are provided to bring the chargers in turn on to the support 11 and into alignment with the guide-passage 12, the open end of a charger being at the lower end when the charger is on the support. When a charger is in position on the support and is ready for the links to be released therefrom (i. e., the upper position in Figure 4 where the chargers are shown in chain lines) a mechanically operated pawl 14 opens the resilient catch 9 and permits the links to slide out of the charger and downwards into the guide-passage 12 formed by the parts 15 and 16. As the conveyor 13 removes links from the lower end of the guide-passage further links slide out of the charger into the upper part of the guide-passage, the downward movement of the links being due to gravity and only controlled by the rate at which the conveyor 13 takes away the links. When sufficient time has lapsed for a charger to empty under normal conditions, the empty charger is pushed away from the position at which it was emptied and is moved in the direction of the arrow shown in chain lines in Figure 4 across the support 11 from which it falls into a tray (not shown). At the same time a further charger is moved from the bottom of the magazine 10 (i. e., the lower position in Figure 4 where the charger 6 is shown in chain lines) across the support and into the discharging position at which it is emptied. A charger is ejected from the discharging position by the next charger being moved into that position from the bottom of the magazine.

The magazine 10 consists of two back rails 17, front or cover rails 18, and a sloping end rail 19 shown broken in Figure 4, all arranged and supported by the support 11 as shown in the drawings. The chargers are moved from the magazine by a pusher-plate 20 fixed to the ends of levers 21 which oscillate about the axis of a shaft 22 supported in a bearing bracket 23. The pusher-plate 20 is operated by an eccentric rod and a strap jointly marked 24. The strap runs on an eccentric 25 which latter is rotatably mounted on a rotatable shaft 26 which is journalled in support brackets 27 and 28, Figure 3, and is driven as described later.

In order to locate and retain a charger in the discharging position, movable abutments 29 are provided. These are formed at the ends of levers fixed to a spindle 30 which is rotatably mounted in brackets 31 fixed beneath the support 11. In Figure 2 it will be seen that the chargers have a flanged base and the operative part of an abutment 29 is shaped to enter the space between the flanges and to locate the chargers as desired. A top guide 32 of angular section simultaneously locates the top surface of the charger. The abutments 29 move up and down through holes 33 in the support 11 and are operated at the proper times by the oscillating levers 21 in the following manner. Each abutment is carried on a double armed lever (see Figure 5) and the ends 34, remote from the abutments, are suitably shaped to engage rollers 35 which are rotatably supported on the levers 21. Springs 36 effect the return movement and cause the abutments 29 to project through the support 11 while the levers 21 move the abutments downwardly again. Thus, as an empty charger is about to be ejected, the abutments 29 are lowered to permit this movement and as the pusher-plate 20 moves back again the abutments rise and locate the freshly filled charger. The rollers 35 are eccentrically mounted on the levers 21 to permit adjustment of the timing of the abutments.

The pawl 14 is also operated by the lever movement. A roller 37 is attached to the left hand lever 21, Figure 3, and engages a lever 38 which is fixed to the spindle 39 on which the pawl 14 is fitted. A spring 40 effects the return movement.

As shown in Figure 4, a charger (the upper one in the figure) is in the link discharging position and the pawl 14 (full lines) is holding open the resilient catch 9. The lever 38 (full lines) is still in engagement with the roller 37 and the pusher-plate 20 is moving in the direction of the full line arrow. Further movement of the pusher-plate 20 will push another charger from the base of the magazine 10 to the discharging position and as this movement occurs the roller 37 will permit the lever 38 to move to the right until finally it occupies the chain line position when, of course, the pawl 14 will also be in the chain line position. This enables the empty charger to be pushed off the support and the new one to take its place. As the pusher-plate 20 moves back again, the roller 37 engages the lever 38 and opens the spring 9 of the new charger.

It may sometimes happen that an incompletely filled charger is put into the magazine or possibly all of the links in the charger do not slide out owing to some defect, for instance the charger may become bent or distorted in transport. In such cases enough links will not be fed to the conveyor 13 unless the shortages are made good. To effect this the feeding of the chargers to the discharging position may be accelerated by turning a hand wheel 41. This is fixed to the eccentric 25 which latter is loosely mounted on the shaft 26 and driven by a ratchet wheel 42, which is fixed to the shaft 26 and engages a spring controlled pawl 43 pivoted on the eccentric. Normally the eccentric 25 rotates with the shaft which moves in the direction of the arrow, Figure 5, but by rotating the hand wheel 41 in the same direction, that is advancing it relatively to the shaft, the pawl 43 trips around the ratchet wheel 42 and the eccentric may be advanced as much as necessary.

The apparatus is driven from the main shaft 44 through a pair of bevel gear-wheels 45 and 46 of which the latter is secured to the shaft 26.

What we claim as our invention and desire to secure by Letters Patent is:

1. Apparatus for feeding links to a cartridge-belt assembling and charging machine comprising in combination, an inclined support, means to feed loaded charges, each having an open end and a resilient catch adjacent the open end to retain oriented links within the charger, in succession to a discharging position on said support in which the supported charger is inclined lengthwise in a downward direction with its open end in the lower position, means to release the resilient catch to permit the links to slide out of the charger, driving mechanism for operating said feeding and releasing means in timed relation, and means to retain the oriented arrangement of the links during their discharge from the charger to the assembling and charging machine.

2. Apparatus for feeding chargers to automatic machines, comprising in combination, a magazine to receive superimposed chargers, each charger including releasable devices for retaining articles within the charger, means including a pusher to feed chargers in succession from the bottom of said magazine to a discharging position and for moving empty chargers therefrom, and means to release said devices to discharge the contents of a charger while the latter occupies the discharging position, and driving mechanism for operating said feeding and releasing means in timed relation.

3. Apparatus for feeding links to a cartridge belt assembling and charging machine comprising in combination, an inclined support, a magazine to receive superimposed chargers, a pusher to feed chargers, each having an open end and a resilient catch adjacent the open end to retain oriented links within the charger, in succession from the bottom of said magazine to a discharging position on said support in which the supported charger is inclined lengthwise in a downward direction with its open end in the lower position, means to release the resilient catch to permit the links to slide out of the charger, driving mechanism for operating said pusher and said releasing means in timed relation, and means to retain the oriented arrangement of the links during their discharge from the charger to the assembling and charging machine.

4. Apparatus for feeding chargers to automatic machines, comprising in combination, means for feeding chargers in succession to a discharging position and for moving empty chargers therefrom, each charger including releasable devices for retaining articles within the charger, a gripping-device to retain a charger in position during the discharge of its contents, means to release said devices to discharge the contents of a charger while the latter occupies the discharging position, and driving mechanism for operating said feeding and releasing means in timed relation.

5. Apparatus for feeding chargers to automatic machines, comprising in combination, a magazine to receive superimposed chargers, means including a pusher to feed chargers in succession from the bottom of said magazine to a discharging position and for moving empty chargers therefrom, each charger including releasable devices for retaining articles within the charger, a gripping-device to retain a charger in position during the discharge of its contents, means to release said devices to discharge the contents of a charger while the latter occupies the discharging position, and driving mechanism for operating said feeding and releasing means in timed relation.

6. Apparatus for feeding links to a cartridge-belt assembling and charging machine comprising in combination, an inclined support, means to feed loaded chargers, each having an open end and a resilient catch adjacent the open end to retain oriented links within the charger, in succession to a discharging position on said support in which the supported charger is inclined lengthwise in a downward direction with its open end in the lower position, a gripping-device to retain a charger in position during the discharge of its contents, means to release the resilient catch to permit the links to slide out of the charger, driving mechanism for operating said feeding and releasing means in timed relation, and means to retain the oriented arrangement of the links during their discharge from the charger to the assembling and charging machine.

7. Apparatus for feeding chargers to automatic machines, comprising in combination, means for feeding chargers in succession to a discharging position and for moving empty chargers therefrom, each charger including releasable devices for retaining articles within the charger, means to release said devices to discharge the contents of a charger while the latter occupies the discharging position, driving mechanism for operating said feeding and releasing means in timed relation, and means operable at will to effect temporary increases in the rate at which chargers are fed to the discharging position.

8. Apparatus for feeding chargers to automatic machines, comprising in combination, a magazine to receive superimposed chargers, each charger including releasable devices for retaining articles within the charger, means including a pusher to feed chargers in succession from the bottom of said magazine to a discharging position and for moving empty chargers therefrom, a gripping-device to retain a charger in position during the discharge of its contents, means to release said devices to discharge the contents of a charger while the latter occupies the discharging position, driving mechanism for operating said feeding and releasing means in timed relation, and means operable at will to effect temporary increases in the rate at which chargers are fed to the discharging position.

9. Apparatus for feeding links to a cartridge-belt assembling and charging machine comprising in combination, an inclined support, means to feed loaded chargers, each having an open end and a resilient catch adjacent the open end to retain oriented links within the charger, in succession to a discharging position on said support in which the supported charger is inclined lengthwise in a downward direction with its open end in the lower position, means to release the resilient catch to permit the links to slide out of the charger, driving mechanism for operating said feeding and releasing means in timed relation, and means to retain the oriented arrangement of the links during their discharge from the charger to the assembling and charging machine, and means operable at will to effect temporary increases in the rate at which chargers are fed to the discharging position.

10. Apparatus for feeding links to a cartridge-belt assembling and charging machine comprising in combination, an inclined support, a magazine to receive superimposed chargers, each charger having an open end and a resilient catch adjacent the open end to retain oriented links within the charger, a pusher to feed chargers in succession from the bottom of said magazine to a discharging position on said support, in which the supported charger is inclined lengthwise in a downward direction with its open end in the lower position, a gripping-device to retain a charger in position during the discharge of its contents, means to release the resilient catch to permit the links to slide out of the charger, driving mechanism for operating said feeding and releasing means in timed relation, means to retain the oriented arrangement of the links during their discharge from the charger to the assembling and charging machine, and means operable at will to effect temporary increases in the rate at which chargers are fed to the discharging position.

GEORGE DEARSLEY.
RICHARD WILLIAM HARRIS.